June 16, 1936.     R. W. SINQUEFIELD     2,044,108
AIRPLANE
Filed Sept. 5, 1933     5 Sheets-Sheet 1
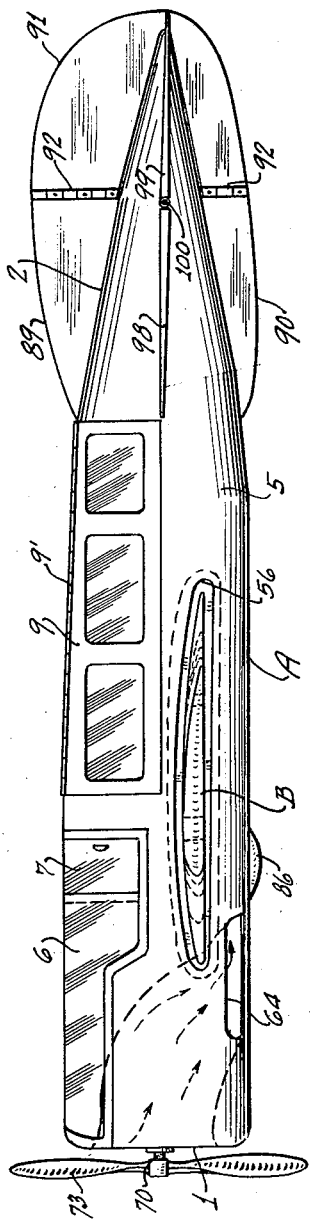
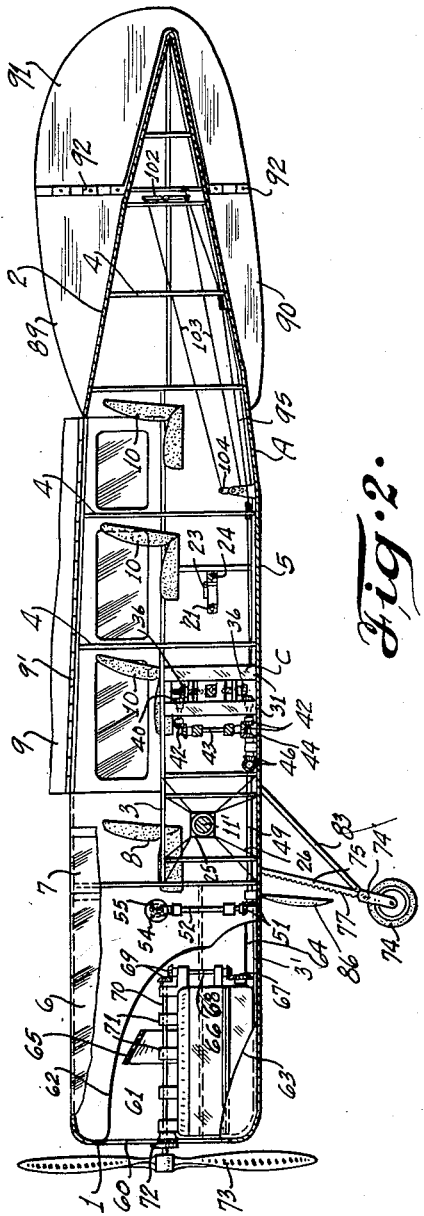
INVENTOR
Rex W. Sinquefield.
By
ATTORNEY

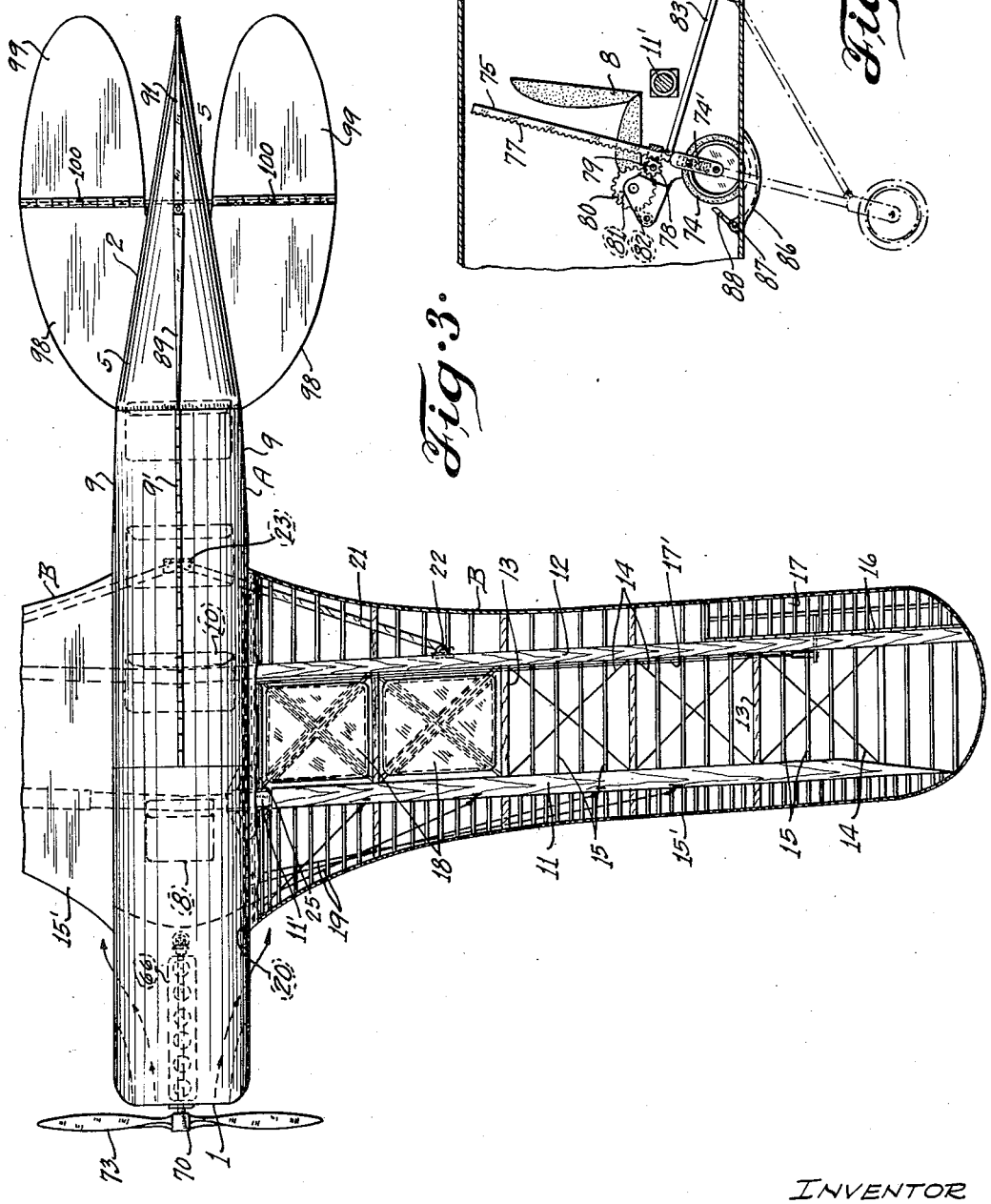
June 16, 1936.     R. W. SINQUEFIELD     2,044,108
AIRPLANE
Filed Sept. 5, 1933     5 Sheets-Sheet 2
INVENTOR
Rex W. Sinquefield.
ATTORNEY

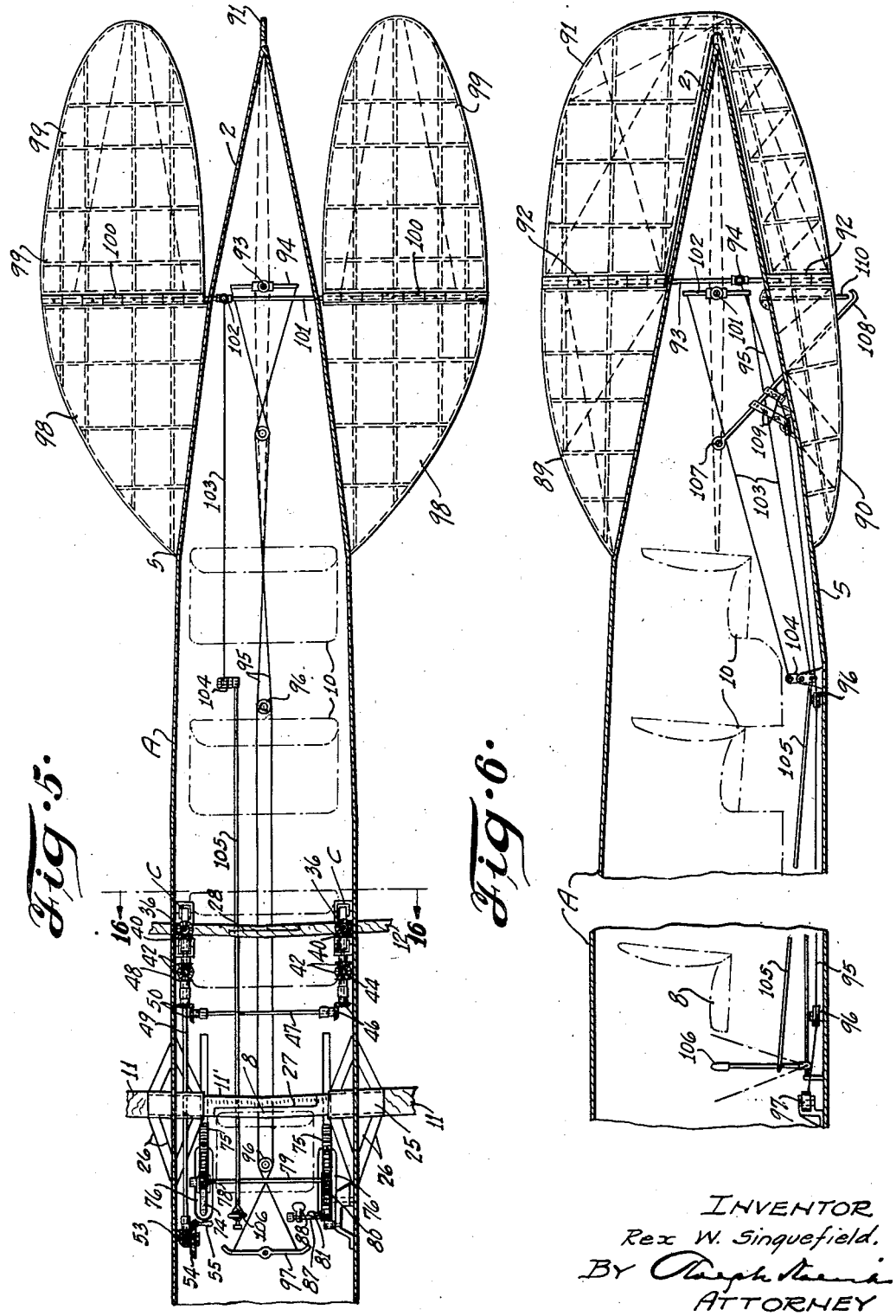

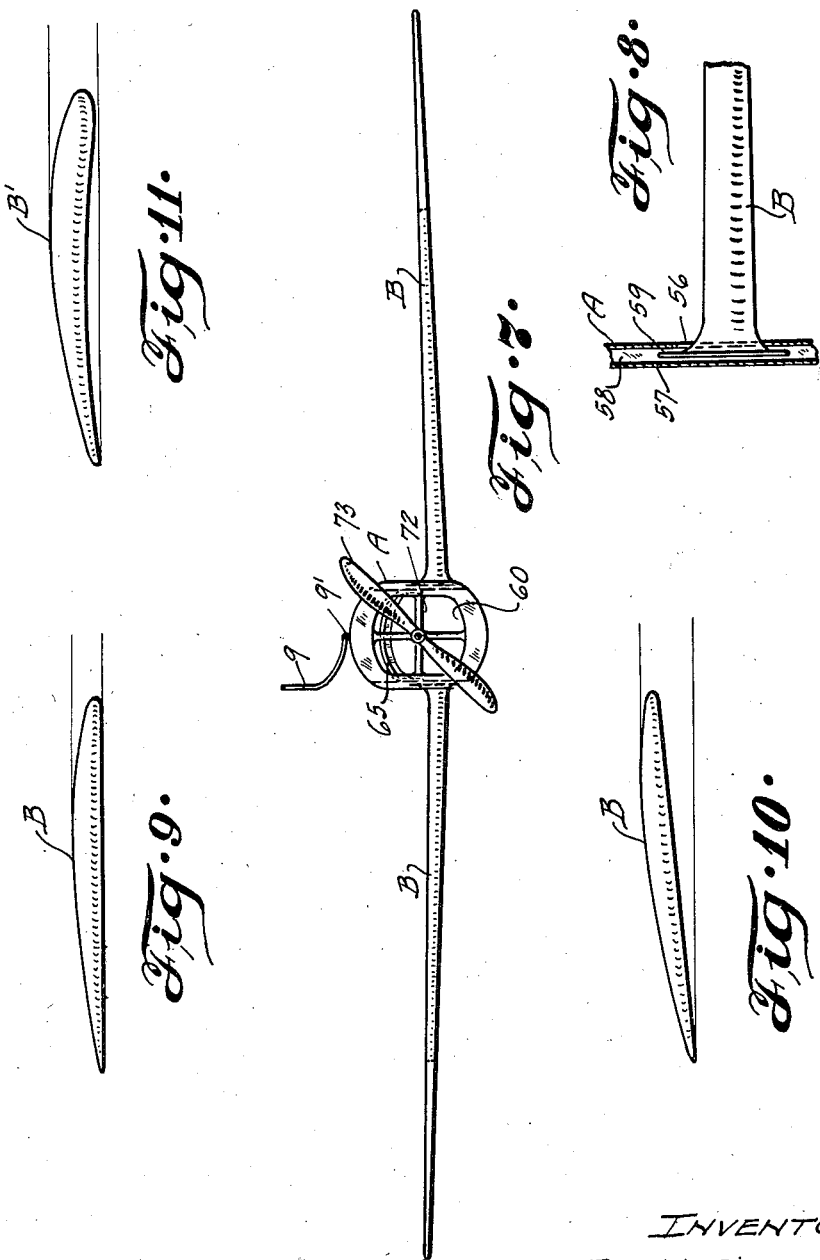

June 16, 1936.  R. W. SINQUEFIELD  2,044,108
AIRPLANE
Filed Sept. 5, 1933  5 Sheets-Sheet 5

INVENTOR
Rex W. Sinquefield.
BY Ralph Reich
ATTORNEY

Patented June 16, 1936

2,044,108

UNITED STATES PATENT OFFICE 2,044,108

AIRPLANE

Rex W. Sinquefield, St. Louis, Mo., assignor of one-half to Ernest M. Crosby, St. Louis, Mo.

Application September 5, 1933, Serial No. 688,159

7 Claims. (Cl. 244—12)

This invention refers generally to aircraft and, more particularly, to a certain new and useful improvement in aircraft of the heavier-than-air-type, commonly known as airplanes.

My invention has for a prime object the provision of an airplane especially, though not exclusively, of the monoplane type having the main or sustaining wing or wings rotatable about their longitudinal axes for selectively changing the camber thereof relatively to the longitudinal axis of the fuselage for conveniently and efficiently varying the angle of incidence of the wing or wings relatively to the line of flight of the airplane.

My invention has for another object the provision, in an airplane having its propeller disposed in front or advance of the fuselage, of a wind-tunnel or tunnels in the fuselage in the draft of the propeller and leading to lateral outlets disposed at the underside of the wings for both reducing the head resistance and augmenting the effective lift of the airplane.

My invention has for still another object the provision, in an airplane of the cabin-type, of a fuselage having its principal structural members for strength, rigidity, and evenness of balance disposed in the lower half thereof, the upper half of the fuselage being equipped, without impairing or reducing the strength of the fuselage, with shiftable or swingable members for affording ready entrance into and exit from the interior of the cabin.

My invention has for a further object the provision, in an airplane having a fuselage of the torpedo style, for stability, strength, convenience of control, and the elimination of outside bracing, of a tail group mounted substantially on the tail-body and approximately symmetrically disposed with respect to the axis of the fuselage.

My invention has for a still further object the provision, in an airplane, of main or sustaining wings of great strength and efficiency, so constructed as to afford ample space for storage of motive fluid and in which speed-retarding bracing is substantially wholly enclosed.

My invention has for an additional and general object the provision of an airplane which has greater safety factors and which may be operated at greater speed and lower cost than any of which I am now aware.

And with the above and other objects in view, my invention resides in the novel features of form, construction, arrangement, and combination of parts presently described and pointed out in the claims.

In the accompanying drawings (five sheets),—

Figure 1 is a side elevational view of an airplane constructed in accordance with and embodying my invention;

Figure 2 is a longitudinal sectional view of the airplane;

Figure 3 is a top-plan view of the airplane, merely a portion of one wing being shown and the covering of the other wing being removed for disclosing the frame structure thereof;

Figure 4 is an enlarged fragmentary sectional view of the fuselage, showing the landing gear in full lines in retracted position and in dot-dash lines in extended position;

Figure 5 is an enlarged sectional plan view of the fuselage, the front portion thereof being omitted and the spars of the main wings being merely fragmentally shown;

Figure 6 is an enlarged vertical sectional view of the rear portion of the fuselage, showing the tail-group and the means for operating the elevators and rudder thereof;

Figure 7 is a reduced front elevational view of the airplane;

Figure 8 is an enlarged detail fragmentary sectional view of the junction of the base of a main wing with the fuselage side-wall;

Figure 9 is an end view of one of the main wings as rotated for high-speed flight with minimum angle of incidence;

Figure 10 is a view similar to Figure 9, showing the wing rotated for low-speed flight with maximum angle of incidence;

Figure 11 is a comparable end view of a typical cambered wing as heretofore employed in airplane construction;

Figure 12:
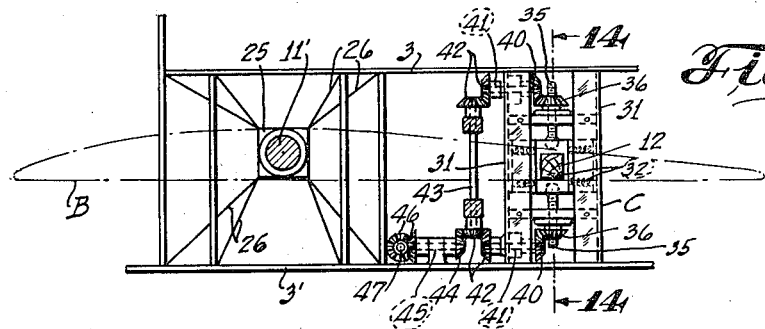
Figure 12 is a fragmentary sectional view of a portion of the fuselage, showing the main wing support and the main wing rotating or rocking apparatus, the latter being shown in position for disposing the wing in leveled or high-speed flight position and the wing being indicated by dot-dash lines.

Referring now more in detail and by reference characters to the drawings, in which I illustrate, as a preferred embodiment of my invention, a monoplane of the enclosed or cabin type, A designates the fuselage of the plane, which comprises an elongated tubular body of the torpedo-type or style having a relatively blunt front end or nose 1, and a tapering rear portion or tail 2.

The fuselage A is characterized by having the principal bracing-members of its frame disposed substantially below its longitudinal axis or center-line, merely the upper and lower longitudinal girts 3, 3', respectively, and the vertical frames or ribs 4 of the frame-skeleton being shown in Figure 2. By so disposing the bracing-members of its frame in the lower portion of the fuselage A, the frame thereof may be made of relatively small and rigid members, the strains therein being directed toward the lower half of the fuselage A, whereby the upper part or top of the fuselage may be made of relatively light-weight construction, serving chiefly as a cover for the cabin of the airplane.

The covering 5 of the frame of the fuselage A is preferably of sheet-metallic material of relatively light-weight, as aluminum-alloy or the like, and at its front end, the fuselage A is equipped with a window 6 of suitably transparent material, A portion 7 thereof being swingably or otherwise shiftable for affording convenient access to the pilot's-seat 8.

Amidships, the fuselage A is equipped with a pair of swingable wall-sections or hood-type doors 9 mounted on a piano-type hinge 9', whose pintle-bar extends longitudinally of the fuselage A along the top center thereof, as best seen in Figures 1 and 2. The doors 9, which are generally of arcuate contour, extend substantially to the side girts 3 of the fuselage and are laterally swingable upwardly from the fuselage sides for affording ready access to the passenger-seats 10. By thus eliminating the usual vertical door-frames and doors, the strength of the fuselage frame, which, as has been said, lies principally below the center of the fuselage A, is unimpaired, and the resulting frame-structure may, therefore, with strength and safety be constructed of lighter weight than would be the case if vertical doors were employed.

B, B, designate the main or sustaining wing-structures, which in plan preferably have the outline or contour best seen in Figure 3, which in opposed relation extend laterally from the opposite sides, and in a substantially horizontal plane located between the center line and the bottom, of the fuselage A at a suitable distance rearwardly of the nose 1 thereof.

The main frame of each wing B comprises a pair of suitably spaced front and rear substantially parallel longitudinal spars or principal wing-frame members 11, 12, respectively, which are connected at suitably spaced intervals by transverse struts 13, between which latter is formed a series of rectangular spaces whose opposite diagonal corners are, in turn, connected by bracing-wires 14, all as best seen in Figure 3.

Suitable ribs 15 are provided in the usual manner for supporting the covering 15' of the wing, the ribs 15 being mounted on, and extending both between and forwardly and rearwardly of, the spars 11, 12, except at the rear outer end or tip portion of the rear spar 12, where the rear spar 12 supports, as by a piano-type hinge 16, a swingable aileron-frame 17 actuable in a conventional manner, as by an operator 17'.

Two or more of the substantially rectangular spaces provided between the spars 11, 12, and the pairs of struts 13 adjacent the fuselage A, are respectively occupied by suitable fuel or gasoline tanks 18, the latter, as will be seen, being thus fully protected from damage and being securely fastened in the wing-structure.

At its base or inner end, each wing B is transversely flared or widened both forwardly and rearwardly where it meets the side-wall of the fuselage A, and in the approximately triangular space so formed on the front side of the wing-base is disposed a series of diagonally extending tension-bracing members or cables 19 of suitable lengths, the same being respectively connected at their one or inner end to a longitudinal frame-beam or girt 20 and at their other or outer end, at suitably spaced intervals therealong, to the front spar 11, as best seen in Figure 3.

A compression member or brace 21 has at its one end a suitable universal or swivel joint connection, as at 22, with the rear-spar 12 at a suitable distance from the inner end thereof and extends diagonally rearwardly inwardly to the center of the fuselage A, where the brace 21 has a like swivel joint connection, as at 23, with a frame cross-member 24, as best seen in Figures 2 and 3.

At its inner end, the front spar 11 is formed or provided with a reduced cylindrical extension or shaft 11', which is mounted for rotatory movement in and through a bearing 25 supported, as by suitable tension-members in the form of rods 26, from, and in the vertical plane of, the adjacent side frame of the fuselage A. The shaft-extensions of opposed spars 11 of the opposite wings B meet endwise and are suitably spliced together, as at 27, at approximately the center of the fuselage, so that the spars 11 form substantially a continuous beam extending from wing-tip to wing-tip, as best seen in Figures 2, 3, and 5.

The rear spars 12 of the opposite wings B also meet endwise and are likewise spliced together, as at 28, at the center of the fuselage, so that they also form a continuous beam extending from wing-tip to wing-tip. At its inner end, each spar 12 passes through, and is supported by, a jack-structure C, which comprises a spar-embracing cross-head 29 laterally shiftable in opposing shoes 30. The cross-head 29 and shoes 30 are, in turn, vertically shiftable in and between a pair of spaced vertical guides 31 mounted in the adjacent side frame of the fuselage A, suitably mounted opposing pairs of tensional-members in the form of springs 32 normally biasing the shoes 30 against the guides 31, as best seen in Figures 5, 14, and 15.

Figure 14:
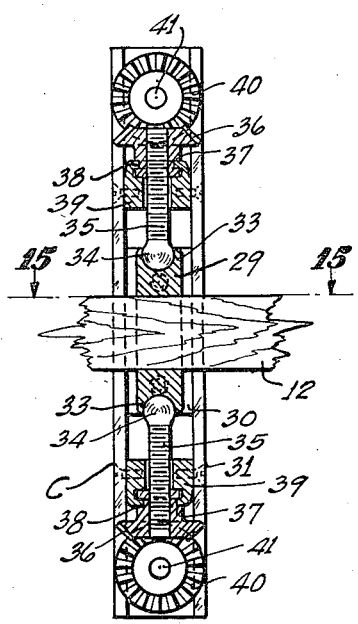
Figure 14 is an enlarged fragmentary sectional view of one of the main wing jacks, taken approximately along the line 14—14, Figure 12, other parts being omitted.
Figure 15:
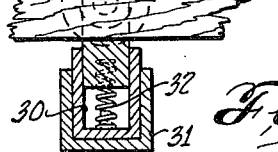
Figure 15 is a fragmentary sectional view taken approximately along the line 15—15, Figure 14.

The cross-head 29 is provided in its upper and lower faces with suitable sockets 33, which are respectively engaged by the ball-formed ends 34 of corresponding upper and lower jack-screws 35, each of which threadedly engages the bore of a corresponding miter-gear 36 whose hub is provided with a groove 37 engaged by fingers 38 extending from a jack-beam 39 supported by and between the upper and lower ends of the guides 31, as the case may be, whereby each gear 36 is rotatably mounted on, but secured against axial movement relatively to, a respective jack-beam 39, as best seen in Figure 14.

The miter-gears 36 mesh with corresponding miter-gears 40 mounted on respective upper and lower countershafts 41 suitably journaled in and through one of the guide-members 31, as shown. In turn, the upper and lower shafts 41 have connection, as by means of corresponding pairs of miter-gears 42, with a suitably supported vertical shaft 43 extending parallel with the adjacent guide 31, as best seen in Figures 12 and 13.

Figure 16:
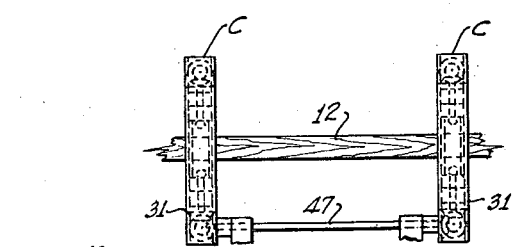
Figure 16 is a fragmentary top-plan view of the pair of main wing-jacks, other parts being omitted.
Figure 13:
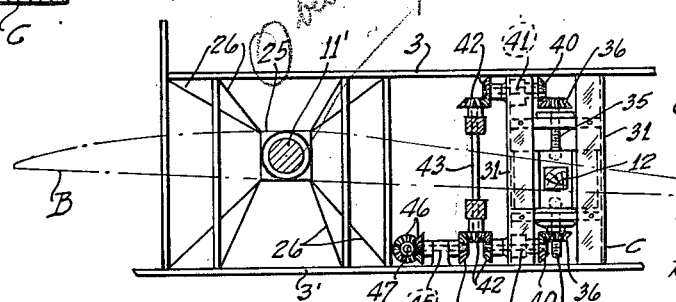
Figure 13 is a view similar to Figure 12, showing the main wing rotating or rocking apparatus in position for disposing the wing in cambered or low-speed flight position, the wing being indicated by dot-dash lines.

Adjacent one side of the fuselage A, the particular lower pair of miter-gears 42 has meshing engagement with a miter-gear 44 mounted on one end of a suitably supported counter-shaft 45, which, in turn, has connection, as by means of a pair of miter-gears 46, with a suitably mounted cross-shaft 47 extending transversely the floor of the fuselage A, as best seen in Figures 5, 13, and 16.

Adjacent the other side of the fuselage A, the other lower pair of miter-gears 42 has meshing engagement with a miter-gear 48 mounted on the adjacent end of a suitably supported shaft 49 extending longitudinally in the fuselage A to a point adjacent the pilot's-seat 8, for purposes shortly appearing, and having connection, as by means of a pair of miter-gears 50, with the cross-shaft 47, as best seen in Figure 5.

At its forward end, the shaft 49 has connection, as by means of a pair of miter-gears 51, with a suitably supported vertical shaft 52, which extends to a convenient height in front of and adjacent to the pilot's-seat 8, and which at its upper end carries a bevel-pinion 53 meshing with a suitably supported bevel-gear or wheel 54 equipped with a handle 55 for convenient manipulation by the pilot seated in his seat 8, as best seen in Figures 2 and 5.

The described arrangement of shafts and gears is so disposed that, on manipulation of the gear-wheel 54 in one direction, the jacks C are simultaneously actuated for lifting or raising the rear-spars 12 relatively to the axis of the bearings 25, the wings B meanwhile pivoting on the shaft-extensions 24 of the front-spars 11 for rotatory movement in the respective bearings 25, the trailing edge of the respective wings B, at the extreme upward position of the spars 12, being then disposed substantially in the horizontal plane of the leading edge thereof, as best seen in Figure 12.

Similarly, when the gear-wheel 54 is manipulated in the opposite direction, the jacks C are simultaneously actuated for dropping or lowering the rear-spars 12 relatively to the axis of the bearings 25, the wings B meanwhile being rotated downwardly for disposing the trailing edge of the respective wings B in a plane below that of the respective leading edges thereof, as best seen in Figure 13.

It will thus be seen that, when the wings B are rotated upwardly, the angle of incidence of the wings B, that is to say, the angle which the plane of the wings B makes with the line of flight, may be readily varied according to the flight requirements of the airplane.

By thus providing for rotation of the wings B for varying the angle of incidence thereof, I am enabled to employ a sustaining wing-structure having the most efficient characteristics at high-speeds of flight, that is to say, the wings B have a relatively flat under-face with little or no inherent camber, the necessary camber of the wings B for slow-speeds being obtained by rotating the wings B for lowering the trailing edge of the wing for increasing the angle of incidence thereof relatively to the line of flight of the airplane, as will be readily understood from Figures 9 and 10, which respectively illustrate high-speed and slow-speed flight positions of the wings B.

I might add that preferably the wings B are given a sweep-back angle of approximately 2½° and a dihedral angle of 1° for providing greater strength and stiffness to the wing structure. The effectiveness of the wing-bracing, such as the cables 19 and struts 21, is also increased by such construction, and it may be pointed out that the braces 19 and struts 21 are wholly enclosed in the wing-structure and hence do not present or cause any drag on the motion of the airplane.

In each side-wall, the fuselage is provided or formed with a slot 56 and a false-wall 57, disposed interiorly of the fuselage A, providing a pocket 58. At its base, each wing B projects through a respective slot 56 of the adjacent fuselage-wall and is provided with a flange 59 working in the pocket 58 for providing a continuity of the fuselage-wall surface at all positions of the wing B and avoiding the formation of eddy currents of air at the junction of the wing B with the fuselage A, as best seen Figures 1 and 8.

In its nose 1, the fuselage A is provided with an opening 60, which leads into a wind-tunnel or chamber 61 formed by suitably curved upper and lower walls 62, 63, respectively, which span the interior of the fuselage A and, sloping convergingly rearwardly and downwardly, lead to respective ports or openings 64 disposed on the opposite sides of the fuselage A below the plane of the wings B and substantially at the leading edge thereof, a suitable deflector or vane 65 being provided in the chamber 61 for deflecting the wind currents downwardly therein, as best seen in Figures 1, 2, and 7.

The prime mover or motor 66 of the airplane is suitably supported in the chamber 61. At its rear end, the crank-shaft of the motor 66 is connected through bevel-gearing 67 with a suitably supported vertical counter-shaft 68, the ratio of the gearing 67 being preferably 3 to 1. The counter-shaft 68, in turn, through a pair of miter-gears 69, drives the torque or propeller-shaft 70, which is preferably journaled in bearings 71 upstanding from the motor 66, and extends outwardly and forwardly through a suitable frame 72 spanning the opening 60 for supporting the propeller 73 of the airplane. As will be seen, the propeller 73 is thus driven at a speed three times that of the motor 66, thus permitting the employment of a relatively slow-speed and long-lived type of motor 66, as best seen in Figures 2 and 7.

That portion of the wind created by the propeller 73 which otherwise would impinge the nose 1 of the fuselage A and thereby create "head-resistance" is, by the construction described, permitted to freely enter into the wind-tunnel 61. The draft of air moving through the chamber 61 most effectively cools the engine 66 and thence, in its consequently heat-expanded state, is discharged through the ports 64 laterally from the opposite sides of the fuselage to and under the respective wings B, thus increasing, in a highly efficient and effective manner, the lifting effect and capacity of the wings B, as will be readily understood from Figures 1 and 3.

The landing gear of the airplane comprises a pair of landing wheels 74 suitably spring mounted, as at 74', in the bifurcated lower end of respective rack-plungers 75 suitably mounted and disposed on opposite sides of the pilot's-seat 8 for shiftable movement obliquely in and through suitable ports or slots 76 provided in the floor or bottom-wall of the fuselage A, as best seen in Figure 5.

Each plunger 75 is provided longitudinally with a series of rack-teeth 77 for meshing with respective pinions 78 mounted on a suitably supported cross-shaft 79 disposed beneath the seat 8. At one side of the seat 8, is a drive-gear 80, which meshes with one of the pinions 78, the gear 80 having a handle 81 for manual manipulation for correspondingly shifting the pair of plungers 75.

The plungers 75 are drawn upwardly for retiring or retracting the landing wheels 74 inwardly through the slots 76 into the fuselage A, as shown in full-lines in Figure 4, and are dropped downwardly for advancing or projecting the wheels 74 outwardly through the slots 76 from the fuselage A, as shown by dot-dash-lines in Figure 4.

A pawl 82 normally engages the gear 80 for preventing reverse movement thereof and of the plungers 75 when the wheels 74 are disposed or dropped from the fuselage A in "landing" position, that is to say, for engaging, and supporting the airplane from, the ground. To the lower end of each plunger 75, is flexibly connected or "knuckled" the front end of a brace-rod or link 83, and the pair of links 83 extend rearwardly through extensions of the slots 76 and terminate in laterally turned arms which slidably work in slots provided in respective guides 84 mounted on the floor of the fuselage A.

At its forward end, the upper wall of each slot in the respective guides 84 is provided with a notch 85 disposed in such manner that, when the wheels 74 are projected in "landing" position, the lateral arms of the links 83 will engage the notches 85 for latching, as may be said, the links 83 against rearward movement, in which position the links 83 provide a brace to the plunger 75 for resisting the thrust from the wheels 74 as the latter engage the ground when landing the airplane, as best seen in Figures 2 and 4.

Suitable doors 86, attached to a transverse shaft 87 supported suitably from the bottom wall of the fuselage A, are normally biased by any convenient means, not shown, for effecting closure of that portion of the respective slots 76 which is widened to receive the wheels 74, and a foot-pedal 88 is provided on the shaft 87 conveniently for manipulation thereof by a person in the pilot's-seat 8 for opening the doors 86 when it is desired to project the wheels 74 through the slots 76, as will be understood from Figures 2 and 4.

The tail 2 of the fuselage A is preferably of the "torpedo" or conical type, and the vertical members of the tail-group of the airplane comprise upper and lower registering stationary fins 89 and 90, which extend substantially in the line of flight rearwardly from approximately the junction of the tail 2 with the main body of the fuselage A to a point approximately half the length of the tail 2, as best seen in Figure 1, the lower fin 90 being approximately one-half the size of the upper fin 89.

It will be seen that the fins 89, 90, each of which comprises a frame of right-angularly disposed structural members and diagonal bracing-wires enclosed within the fin-covering, as best seen in Figure 6, are disposed so as to straddle, as it may be said, the tail 2 of the fuselage A, whereby the projection of either of the fins 89, 90, from the fuselage A is less, and the fins 89, 90, are inherently more rigid, than would be the case if a single fin of the same total area were disposed all on one side of the fuselage A. In comparison with the latter case; I avoid, by my construction, the need of outside bracing wires or the like for reinforcing or guying the fin structures, and the fins 89, 90, are furthermore disposed more nearly in the line of flight of the airplane.

The rudder 91, which, as shown, is relatively long and narrow in structure, extends a suitable distance rearwardly of the fuselage A and is suitably bifurcated or of V-shape in side elevation for swingably embracing the tail 2. At their forward end, the upper and lower bifurcations or legs of the rudder 91 are hingedly connected, as by piano-hinges 92, to the trailing margins of the respective fins 89, 90, the hinges 92 having a common vertical pintle or rudder-shaft 93, which is suitably attached to the rudder 91, which extends through the tail 2, as best seen in Figure 6, and which is of such size and stiffness as to also re-enforce and brace the fins 89, 90.

Interiorly of the fuselage A, the rudder-shaft 93 is equipped with a transverse tiller-arm 94, to the respective opposite ends of which are secured a pair of tiller-cables 95 which are run forwardly in the fuselage A over suitably mounted idler-sheaves 96 and are attached to the respective opposite ends of a pivotally mounted tiller-lever 97 suitably disposed for manipulation by the feet of a person seated in the pilot's-seat 8, as best seen in Figure 5.

The tail-group also includes a pair of horizontal stabilizers or fins 98 respectively projecting laterally from, and in the plane of, the approximate center-line of, the tail 2. The fins 98 are structurally quite similar to the fins 89, 90, and like the fins 89, 90, the stabilizers 98 extend from approximately the junction of the tail 2 with the main body of the fuselage A to a point approximately half the length of the tail 2, as best seen in Figure 3, and a pair of elevators or flippers 99 extend rearwardly, each from a respective stabilizer 98, to the trailing margins of which the elevators 99 are hingedly connected, as by piano-hinges 100 having a common horizontal pintle or elevator-shaft 101 attached to the respective elevators 99 and extending through the tail 2, as best seen in Figure 5, the shaft 101 being also of suitable size and thickness for reenforcing and bracing the fins 98.

The shaft 101 carries a vertical tiller-arm 102, to the respective opposite ends of which is attached a pair of cables 103, which extend forwardly in the fuselage A and are attached at their forward end to a suitably mounted pivoted lever 104. To one end of the lever 104, is connected a link or rod 105, which, extending further forwardly in the fuselage A, is connected, in turn, to a control lever or "stick" 106 suitably mounted in front of, and for convenient manipulation by a person seated in, the pilot's-seat 8, as best seen in Figure 6.

A shaft 107 is mounted transversely of the fuselage A and supports one end of a bar or tail-skid 108, which extends obliquely rearwardly and downwardly through a suitable slot, not shown, provided in the bottom wall of the tail 2 and also through the lower fin 90 for projecting a suitable distance therebelow.

A pair of tension-bands 109, mounted on the bottom wall of the tail 2, engage the tail-skid 108 for normally biasing the ground-engageable end thereof a suitable distance downwardly from a stop or post 110 projecting from the bottom of the fin 90, the tension-bands 109 yielding to impingement of the tail-skid 108 with the ground for absorbing the shock of landing the airplane and the stop 110 serving to limit the swing of the tail-skid 108, as will be readily understood from Figure 6.

The craft as a whole may be economically constructed, and among other distinctive features of the airplane, it may be pointed out that, as will be understood from the foregoing description, all bracing wires and struts are fully enclosed within the wings, fuselage, and tail-group members, whereby, in flight, the wind resistance of the airplane structure is reduced to a minimum.

The wing resistance is likewise reducible to a minimum by "leveling" the wings B after the airplane has taken off and gained its altitude, the airplane then flying with little or no camber in its wings.

Finally, the head resistance is reduced to a minimum by admitting the head-wind into the air-tunnel or chamber 61 in the nose of the fuselage A, and a positive increment to the lift of the wings B is obtained by the diversion of the head-wind to the underside of the wings B.

The movement of the head-wind through the air-tunnel 61 is employed most efficiently for cooling the engine 66, whereby it becomes practicable to employ, as in the present instance, an in-line engine of the air-cooled type disposed in the air-tunnel 61. By this construction, the saving in weight possible by using an air-cooled engine is obtained, and since the propeller 73 may most conveniently be gear-driven from the engine 66, the latter may be of the slow-speed type for affording long life and economical operation thereof.

By carrying the main structural members of the fuselage A continuously through the lower half thereof, the weight and cost of the fuselage A is reduced to a minimum, and I might add that preferably the seats 8, 10, are fastened to and between the side walls of the fuselage, thus not only stiffening the fuselage transversely, but also eliminating the need of legs or like supports for the seats and providing a clear space beneath the seats for the bracings, gears, controls, and the like.

The hood-type of doors 9, which open from either side of the fuselage, provides for ready access to the interior of the plane, eliminates any cutting through the fuselage frame for vertical door-frames, and also avoids the necessity of providing aisles between the seats, whereby the maximum seating capacity is obtained with minimum width of the fuselage A.

The airplane fulfills in every respect the objects previously stated and provides a structure, which, compared with airplanes as heretofore constructed, is, as far as I am aware, of lighter weight and greater strength, has less head resistance, is much safer in use, and is more economical in operation.

It will be understood that changes and modifications in the form, construction, arrangement, and combination of the several parts of the airplane may be made and substituted for those herein shown and described, without departing from the nature and principle of my invention.

Having thus described my invention, what I claim and desire to secure by Letters Patent is,—

1. In an airplane, a fuselage, a pair of sustaining wings each including front and rear spars oppositely extending laterally outwardly from the fuselage, extensions presented inwardly from and aligning with the respective wing-spars, the extensions of the spars of one wing aligning with and being rigidly joined to the extensions of the respective spars of the other wing, bearings on the fuselage for supporting the joined front spar-extensions for wing oscillation, and means for oscillating the wings in unison for varying the angle of incidence, said means including opposed jack-screws supported in vertical alignment upon opposite sides of, and having opposed end-engagement with, the joined rear spar-extensions.

2. In an airplane, a fuselage, a pair of sustaining wings each including front and rear spars oppositely extending laterally outwardly from the fuselage, extensions presented inwardly from and aligning with the respective wing-spars, the extensions of the spars of one wing aligning with and being rigidly joined to the extensions of the respective spars of the other wing, bearings on the fuselage for supporting the joined front spar-extensions for wing oscillation, and means for oscillating the wings in unison for varying the angle of incidence, said means including a cross-head embracing the joined rear spar-extensions, and opposed jack-screws supported in vertical alignment upon opposite sides of, and having opposed end ball-engagement with, the cross-head.

3. In an airplane, a fuselage, a pair of sustaining wings each including front and rear spars oppositely extending laterally outwardly from the fuselage, extensions presented inwardly from and aligning with the respective wing-spars, the extensions of the spars of one wing aligning with and being rigidly joined to the extensions of the respective spars of the other wing, bearings on the fuselage for supporting the joined front spar-extensions for wing oscillation, and means for oscillating the wings in unison for varying the angle of incidence, said means including a pair of vertically disposed guides fixed in the fuselage, shoes slidable in the guides, a cross-head embracing the joined rear spar-extensions and engaged by the shoes for movement therewith relatively to the guides, and opposed jack-screws supported in alignment upon opposite sides of, and having opposed end-engagement with, the cross-head.

4. In an airplane, a fuselage, a pair of sustaining wings each including front and rear spars oppositely extending laterally outwardly from the fuselage, the extensions presented inwardly from and aligning with the respective wing-spars, the extensions of the spars of one wing aligning with and being rigidly joined to the extensions of the respective spars of the other wing, bearings on the fuselage for supporting the joined front spar-extensions for wing oscillation, and means for oscillating the wings in unison for varying the angle of incidence, said means including a pair of vertically disposed guides fixed in the fuselage, shoes slidable in the guides, a cross-head embracing the joined rear spar-extensions and engaged by the shoes, the cross-head being slidable with the shoes relatively to the guides, and being yieldingly laterally shiftable in the shoes, and opposed jack-screws supported in alignment upon opposite sides of, and having opposed end-engagement with, the cross-head.

5. In an airplane, a fuselage, a pair of sustaining wings each including front and rear spars oppositely extending laterally outwardly from the fuselage, extensions presented inwardly from and aligning with the respective wing-spars, the extensions of the spars of one wing aligning with and being rigidly joined to the extensions of the respective spars of the other wing, bearings on the fuselage for supporting the joined front spar-extensions for wing oscillation, and means for oscillating the wings in unison for varying the angle of incidence, said means including a pair of vertically disposed guides fixed in the fuselage, shoes slidable in the guides, a cross-head embracing the joined rear spar-extensions and engaged by the shoes, the cross-head being slidable with the shoes relatively to the guides and being yieldingly laterally shiftable in the shoes, opposed jack-screws supported in alignment upon opposite sides of, and having opposed end-engagement with, the cross-head, and a plurality of meshing gears for concurrently actuating the jack-screws.

6. An airplane comprising a fuselage and a wing extending laterally outwardly from the fuselage, said wing including a pair of spaced front and rear spars, a series of spaced transverse struts extending between and fixed to the spars, a series of tension bracing-members of varying length disposed forwardly of the front spar in approximately the horizontal plane of the wing and connected at one end to the fuselage and at their respective other ends to the front spar at spaced intervals therealong, and a covering enclosing the spars, struts, and bracing-members.

7. An airplane comprising a fuselage and a wing extending laterally outwardly from the fuselage, said wing including a pair of spaced front and rear spars, a series of spaced transverse struts extending between and fixed to the spars, a series of tension bracing-members of varying length disposed forwardly of the front spar in approximately the horizontal plane of the wing and connected at one end to the fuselage and at their respective other ends to the front spar at spaced intervals therealong, a strut disposed rearwardly of the rear spar in approximately the horizontal plane of the wing and having universal joint-connection at one end with the rear spar and at its other end with the fuselage, and a covering enclosing the spars, the struts, and the bracing-members.

REX W. SINQUEFIELD.